Aug. 7, 1934.　　W. J. PEARMAIN　　1,969,149
CLUTCH
Filed May 6, 1929
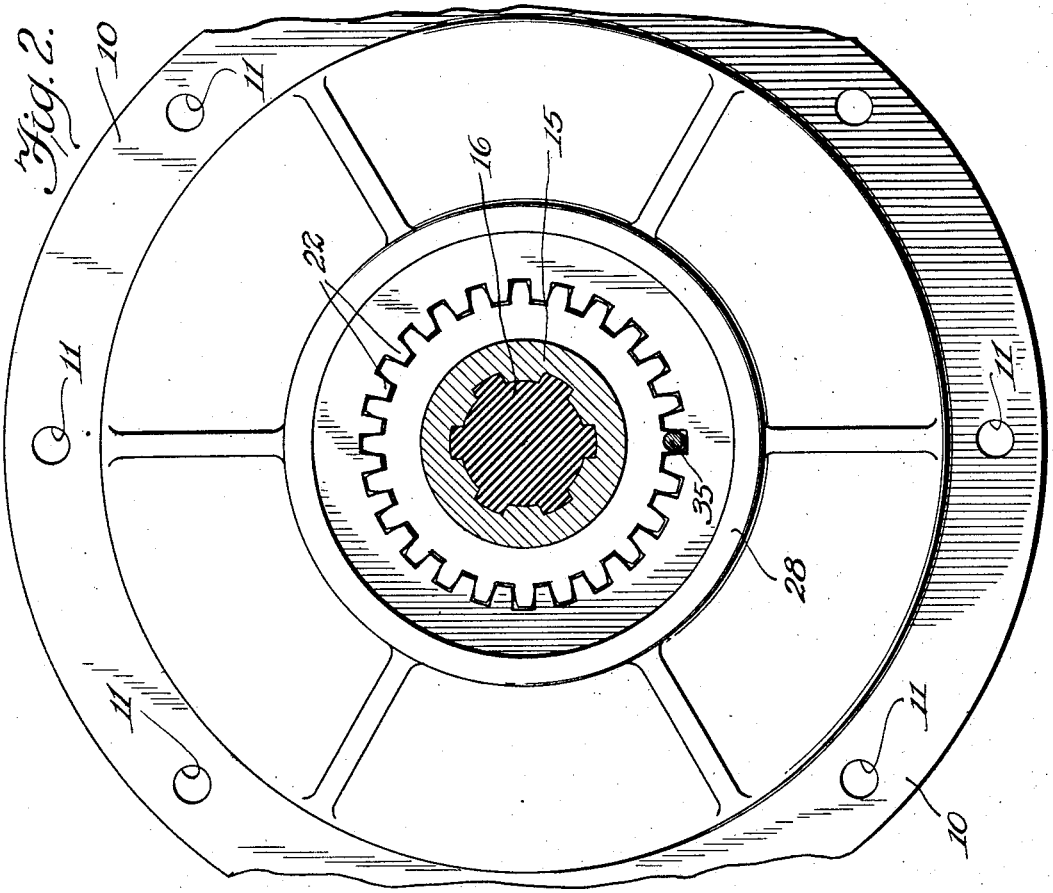
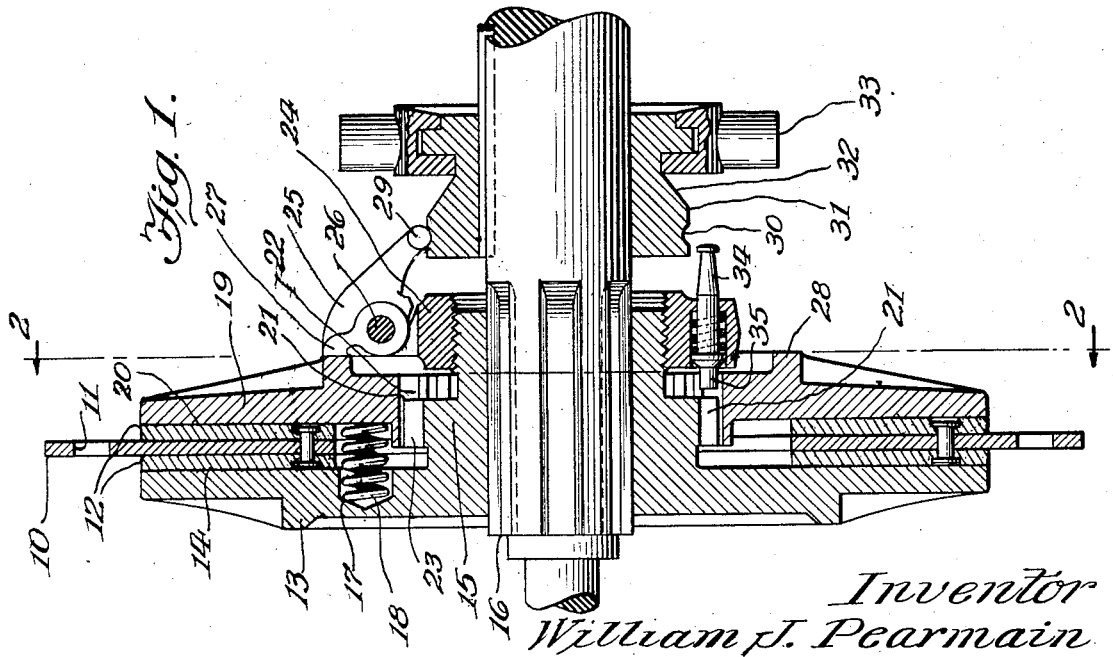
Inventor
William J. Pearmain
By Rector, Hibben, Davis & Macauley
Attys.

Patented Aug. 7, 1934

1,969,149

UNITED STATES PATENT OFFICE 1,969,149

CLUTCH

William J. Pearmain, Racine, Wis., assignor to The Twin Disc Clutch Company, Racine, Wis., a corporation of Wisconsin Application May 6, 1929, Serial No. 360,888

6 Claims. (Cl. 192—68)

My invention relates to clutches of the type in which a friction plate connected to a rotary part, such as a flywheel, is gripped for driving engagement between a pair of members, both of which are movable relative to the friction plate for the purpose of opening and closing the clutch. It is the principal object of my invention to provide a clutch of the character described embodying simple and effective means for securing an interlocking engagement between the gripping members and to utilize this means further in conjunction with a form of locking pin for the purpose of securing a locked adjustment of the gripping members to compensate for the wear of the clutch facing. Other objects of the invention will become more apparent in the following specification, reference being had to the accompanying drawing, and the novel means by which said objects are effectuated will be definitely pointed out in the claims.

In the drawing, Fig. 1 is a sectional elevation of my improved clutch, taken across the diameter thereof; and Fig. 2 is a section along the line 2—2 in Fig. 1.

The numeral 10 designates a clutch plate having a plurality of holes 11 through which bolts may be passed to secure said plate to a rotary part, such as a flywheel. Facings 12 of suitable friction material are secured to the opposite sides of said plate and one of said facings is engageable by a gripping member, having a working face 14. The member 13 is provided with a hub 15 having a bore which is splined for slidable and rotative engagement with a shaft 16. Said member is further provided with a plurality of spaced pockets 17 which are disposed around and at equal distances from said shaft and in each of which is positioned one end of a spring 18. The other end of each of said springs cooperates with the adjacent inner face of a second gripping member which is formed as a floating plate 19 having a working face 20 for frictional engagement with the adjacent clutch facing 12. The bore 21 of the plate 19 is formed as an internal gear having teeth 22 which mesh with similar teeth 23 provided on the hub 15. For a purpose hereinafter explained, the teeth 22 are longer than the teeth 23, thereby providing free portions of the former adjacent one face of the plate 19.

A fulcrum ring 24, which serves as an adjusting element, is threaded on the hub 15 and carries a plurality of levers 25, each of which is pivotally connected to said ring by means of a pin 26. Each of said levers includes a short arm 27 whose face coacts with an adjacent face 28 provided on the plate 19 and also with a nose 29 at the other end of said lever which, when the clutch is in driving engagement, rides in a groove 30 formed on a collar 31 that is slidably mounted on the shaft 16. Said collar further includes a conical surface 32 and trunnions 33 which may be actuated by any suitable form of shifting lever. A locking pin 34 is slidably mounted in the ring 24 and is spring-actuated to normally maintain said pin in the position shown in Fig. 1 with the inner end 35 thereof in locking engagement with the flanks of a pair of teeth 22 on the plate 19.

As shown in Fig. 1, the clutch is in driving position. When the collar 31 is moved to the left, as shown in said figure, the noses 29 of the levers 25 will move along the conical surface 32, thereby relieving the pressure exerted by said levers against the face 28 and permitting the springs 18 to spread the member 13 and plate 19 from driving engagement with the clutch facings 12. When the collar 31 is moved to the right, as shown in Fig. 1, pressure will be exerted by the arms 27 of each of the levers 25 to force the plate 19 into frictional engagement with the adjacent facing 12. At the same time, the member 13 will be moved to the right, as shown in Fig. 1 owing to the mounting of the levers 25 on the ring 24, to place said member in frictional engagement with the adjacent facing 12. It will be obvious from an inspection of Figs. 1 and 2 that driving engagement between the member 13 and the plate 19 is effectively secured by the teeth 22 and 23 and that this form of construction also permits a relative axial movement of said elements into and out of the driving position.

As the clutch facings wear, it becomes necessary to make such an adjustment as will secure a proper frictional engagement of the member 13 and plate 19 with the facings 12. This adjustment is effected by first withdrawing the locking pin 34 until the inner end 35 thereof is free of engagement with the teeth 22, after which the ring 24 may be turned to the desired position and the locking pin 34 is then inserted between the flanks of a new pair of teeth 22. Accordingly, it will be apparent that the tooth engagement between the member 13 and plate 19 both secures a driving engagement therebetween and is also taken advantage of through the locking pin 34 to prevent accidental turning of the ring 24 which is used as a means of adjusting the clutch for wear.

While I have shown one set of elements and combinations thereof for effectuating my improved clutch, it will be understood that the same is intended for purpose of illustration only and in nowise to restrict my device to the exact forms and structures shown, for many changes may be made therein without departing from the spirit of my invention.

I claim:

1. A clutch comprising in combination a friction plate for attachment to a rotary part, a pair of slidable gripping members disposed on opposite sides of said plate and having tooth engagement with each other for securing driving engagement therebetween, the teeth of one member being longer than the other, an adjusting ring carried by said member having the shorter teeth, levers on said ring for actuating said members, and a locking pin mounted in said ring and engageable with the flanks of a pair of the longer teeth.

2. A clutch comprising in combination a friction plate for attachment to a rotary part, cooperating slidable gripping members disposed on opposite sides of said plate, one of said members including a hub provided with an external gear and the other of said members including an internal gear having teeth longer than said external gear, the teeth of said gears meshing, an adjusting ring carried by said hub, levers on said ring for actuating said members, and a locking pin mounted in said ring for engagement with the flanks of a pair of the internal gear teeth.

3. A clutch comprising in combination a friction plate for attachment to a rotary part, a pair of slidable gripping members disposed on opposite sides of said plate and having tooth engagement with each other for securing driving engagement therebetween, the teeth of one member being longer than the other, an adjusting ring mounted on one of said members, levers connected to said ring for actuating said members, and a locking pin mounted in said ring and engageable with the flanks of a pair of the longer teeth.

4. A clutch comprising in combination a friction plate for attachment to a rotary part, cooperating slidable gripping members disposed on opposite sides of said plate, one of said members including a hub provided with an external gear and the other of said members including an internal gear having teeth longer than said external gear, the teeth of said gears meshing, an adjusting ring mounted on one of said members, levers connected to said ring for actuating said members, and a locking pin mounted in said ring for engagement with the flanks of a pair of the internal gear teeth.

5. A clutch comprising in combination a friction plate for attachment to a rotary part, cooperating slidable gripping members disposed on opposite sides of said plate, one of said members including a hub provided with an external gear and the other of said members including an internal gear, the teeth of said gears meshing and the teeth of one gear being longer than the teeth of the other gear, an adjusting ring mounted on one of said members, levers connected to said ring for actuating said members, and a locking pin mounted in said ring for engagement with the flanks of a pair of the longer teeth.

6. A clutch comprising in combination a friction plate for attachment to a rotary part, a shaft constituting a second rotary part, a pair of gripping members disposed on opposite sides of said plate, one of said members having a hub provided with an external gear and the other of said members an internal gear having teeth longer than said external gear, the teeth of said gears meshing, one of said members having driving engagement with said shaft and slidable thereon and the other member being slidable on the shaft-mounted member, an adjusting ring mounted on one of said members, levers connected to said ring for actuating said members, and a locking pin mounted in said ring for engagement with the flanks of a pair of the internal gear teeth.

WILLIAM J. PEARMAIN.